Ernst Thielenhaus
INVENTOR

BY Karl F. Ross
Attorney

Sept. 30, 1969  E. THIELENHAUS  3,469,351
METHOD OF AND APPARATUS FOR MACHINING DISK-SHAPED WORKPIECES
Filed July 29, 1966  4 Sheets-Sheet 4

Ernst Thielenhaus
INVENTOR.

BY Karl G. Ross
Attorney

United States Patent Office

3,469,351
Patented Sept. 30, 1969

3,469,351
METHOD OF AND APPARATUS FOR MACHINING DISK-SHAPED WORKPIECES
Ernst Thielenhaus, Wuppertal-Barmen, Germany, assignor to Firma Ernst Thielenhaus Maschinenfabrik, Wuppertal-Barmen, Germany, a corporation of Germany
Filed July 29, 1966, Ser. No. 568,785
Claims priority, application Germany, Apr. 15, 1966, M 69,163; M 69,164
Int. Cl. B24b 5/02, 1/00, 47/02
U.S. Cl. 51—118     9 Claims

ABSTRACT OF THE DISCLOSURE

An apparatus and a method for the machining of disk-shaped workpieces (e.g. brake disks) in which two abrasive rotatable tools are brought into contact with the workpiece from oppoiste sides. The tools are simultaneously advanced during rotation of the tools and the workpiece and are halted while the rotation of the tools continues with respect to the workpiece. Rotation of the workpiece presents a different angular portion of the work to the tools which are then further advanced.

---

My present invention relates to the machining of disk-shaped workpieces, such as the disks used in automotive brake systems.

In the manufacturer of brake disks and similar workpieces it is known to mount two abrasive tools, or tool combinations such as a grinding head and a finishing head, in confronting positions on opposite sides of a workpiece rotatably carried on a spindle for the simultaneous machining of both surfaces of the workpiece. The tool or tools on each side of the workpiece are progressively advanced toward a predetermined end position in which they are arrested, e.g. by a suitable limit switch, in order to machine the corresponding surface to the desired depth. This requires, however, a very exact mounting of the workpiece on its spindle, in relation to the setting of the associated limit switches, and further presupposes an almost perfectly planar shape of the disk blank; if the periphery of the workpiece is somewhat warped, the finished article will not be of the requisite uniform thickness within the prescribed tolerances. Moreover, the simultaneous but independent advance of the grinding and/or finishing tools toward the opposite disk surfaces may generate stresses resulting in the deformation of an initially perfect blank.

The general object of my present invention, therefore, is to provide a method of and means for so machining such workpieces that the aforestated inconveniences are avoided and that even delicate and/or slightly warped disk blanks may be ground and finished to a practically uniform thickness.

A more particular object of this invention is to provide a method of so operating an apparatus of the character set forth that warpages in a disk blank can be eliminated during machining thereof.

In accordance with an important feature of my invention, the abrasive tools on opposite sides of the workpiece are mounted on respective shafts which are advanced under substantially equal fluid pressure, e.g. hydraulically, against the confronting workpiece sides during at least an initial phase of a machining operation so that their axial pressures upon the workpiece balance each other, thereby preventing any undesired deformation of the disk. If warpage is present, the tools will oscillate axially with the workpiece periphery and, in doing so, will maintain the same balanced pressure relationship over a full revolution of the disk so that its thickness remains constant as a function of the exerted fluid pressure and the duration of the machining operation. There will be no tendency for the development of any stresses which would deform an initially planar disk blank.

According to another feature of the invention, a warped disk can be straightened (if its peripheral undulations are shallow compared with its thickness) by first proceeding in the aforedescribed manner whereupon, after an initial machining operation with axially oscillating tools, the latter are axially immobilized, e.g. in an intermediate position of their axial swing, so that each tool begins to cut into the overhanging part of its disk surface and flattens it. If necessary, the advance of the tools toward each other can then be resumed, followed by a further halting of this displacement in a position in which continued machining will extend the flattened surface area, and this procedure may be repeated as often as is necessary to produce a completely planar workpiece. The axial immobilization of the confronting tools need not occur simultaneously but may be carried out in different angular positions of the disk, depending upon the extent of the zone to be flattened on each side during this stage of machining.

Although the mode of operation just described will usually be performed with the rough-grinding tools, the same can also be carried out—particularly in the case of very slight warpage—with the finishing tools.

The above and other features and objects of my invention will become more fully apparent from the following detailed description of a preferred embodiment, reference being made to the accompanying drawing in which.

Figure 1:
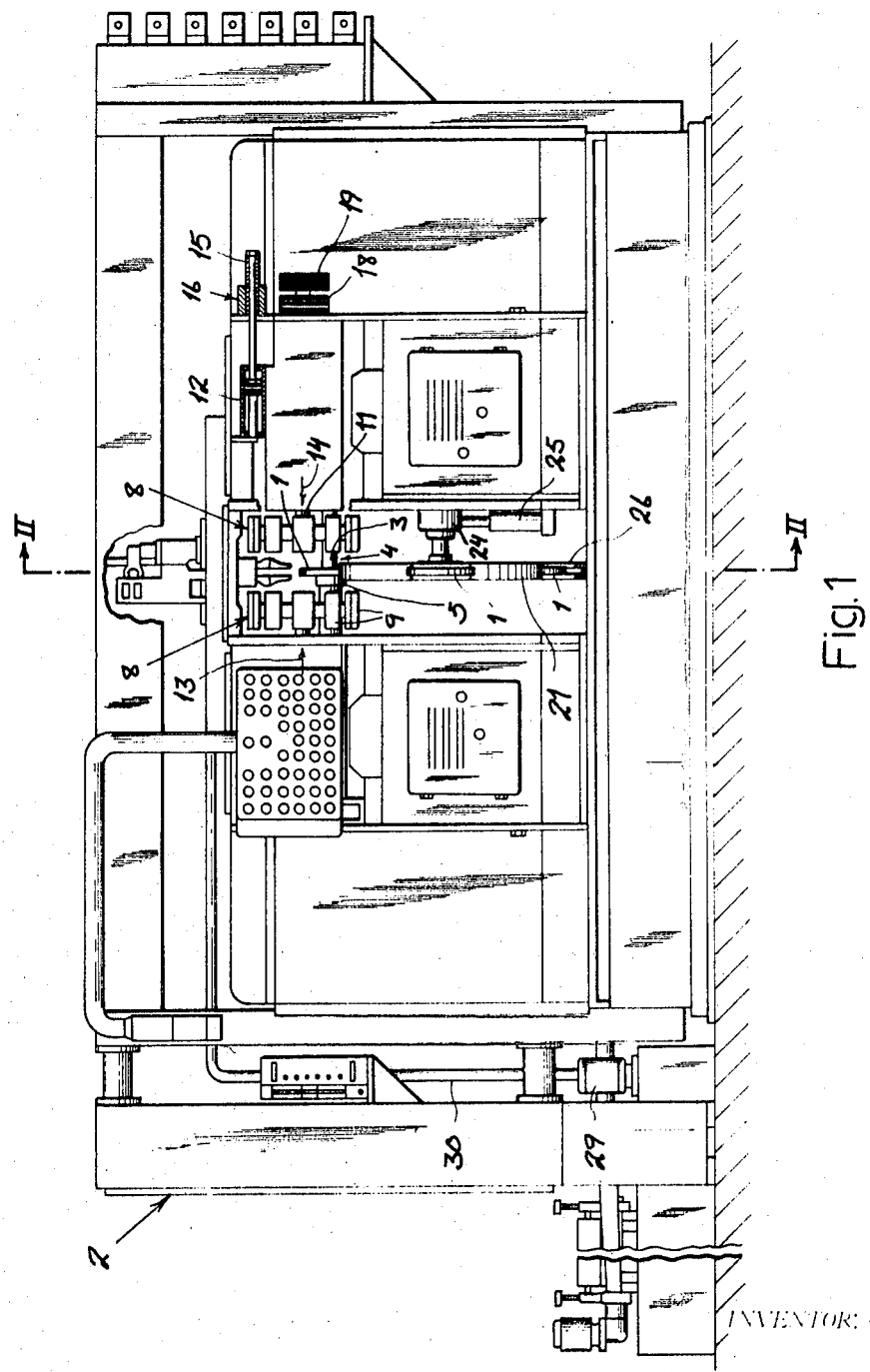
FIG. 1 is a side-elevational view of a disk-machining apparatus according to the invention.

The machine shown in FIGS. 1–3 comprises a frame 2 on which there are mounted conventional means, not described in detail, for driving and controlling the various movable elements referred to hereinafter. These movable elements include a spindle 3 which, together with an associated live center 5, defines a work station 4 (FIG. 1) adapted to receive a succession of disk-shaped workpieces 1 from a supply reel 21 and to return the finished workpieces to this supply reel.

The spindle 3 is, for this purpose, axially movable to enter a center hole of a fresh workpiece which is carried in one of four lateral recesses 23 of reel 21, having been fed thereto by a downwardly inclined inlet channel 20 (FIG. 2) terminating laterally of the reel. Reel 21 is intermittently rotatable by a motor 24 (FIG. 1) which in turn can be raised and lowered, together with the reel, with the aid of a hydraulic jack 25. By this means, a disk 1 lodged in a recess 23 at the zenith of reel 21 can be lifted into coaxial relationship with spindle 3 for introduction of the latter into the center bore of the disk which, upon being clamped between the spindle and the live center 5, is rotatively entrained about its own axis at a relatively slow rate.

A pair of grinding heads 6, composed of annular arrays of abrasive segments 7, and a pair of finishing heads 8, similarly composed of segments 9, are disposed on opposite sides of work station 4 for simultaneous coarse grinding and subsequent simultaneous finish grinding of both surfaces of the disk 1. After this has been done, the aforedescribed sequence of operations is reversed with the withdrawal of spindle 3 and center 5, followed by vertical reciprocation of jack 25 to raise and lower the reel 21 for the purpose of returning the finished workpiece to its recess 23 on the reel, the motor 24 being then again energized to rotate the reel through an angle of 90° so that a new workpiece is aligned with work station 4.

The finished workpiece eventually reaches an outgoing, downwardly inclined channel 22, leading to a discharge point. A curved strip 26 extends partly around the periphery of reel 21 to prevent the workpieces 1 from falling out.

Figure 3:
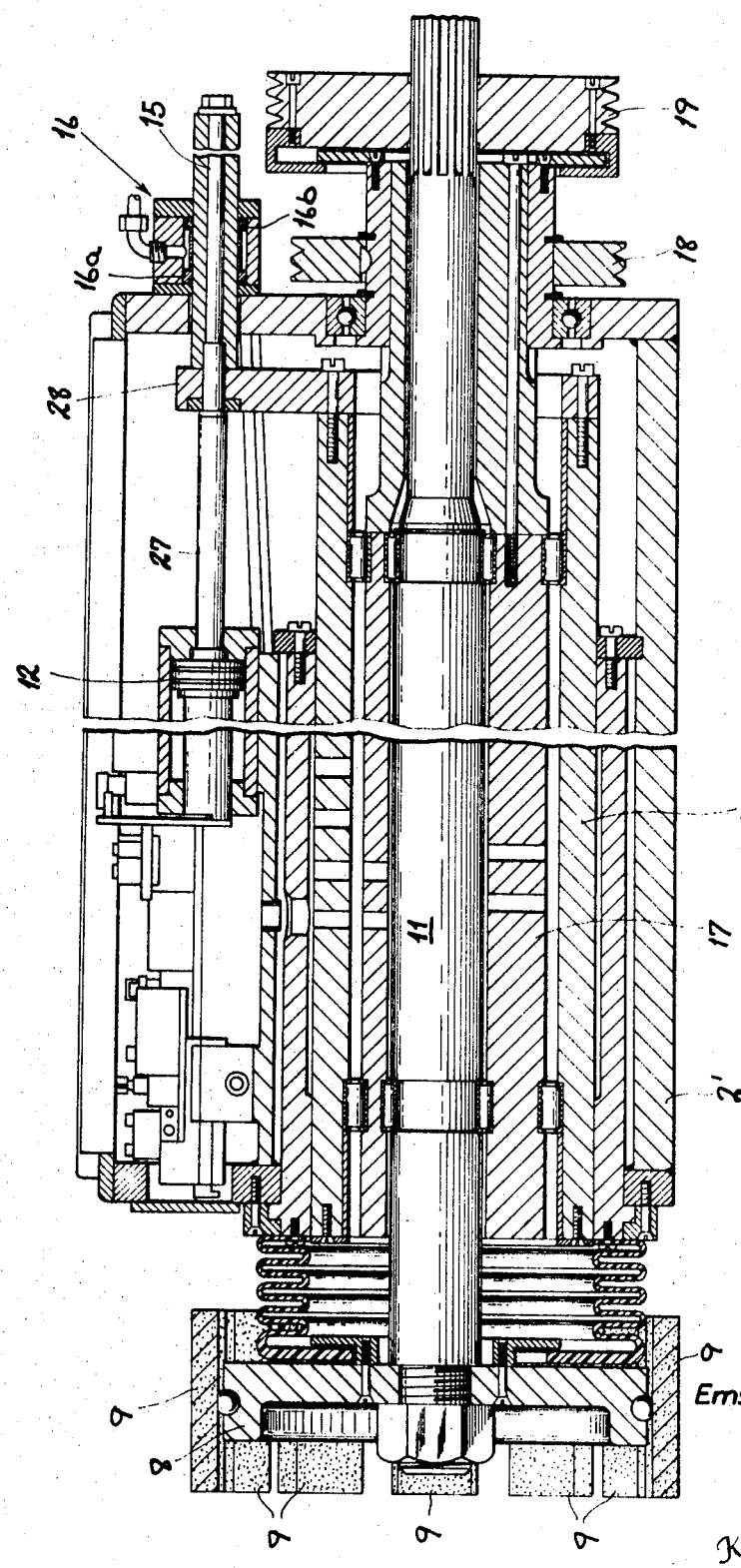
FIG. 3 is a side-elevational view of one of the grinding heads and associated hydraulic control mechanism of the machine shown in FIGS. 1 and 2.

As best illustrated for one of the finishing heads 8 in FIG. 3, each of the heads 6, 8 is mounted on a spindle 11 rotatably held in a surrounding sleeve 10. The sleeve 10 is nonrotatably mounted but axially slidable, together with its spindle 11 and head 8, in a cylindrical housing 2' rigid with machine frame 2. A piston rod 27, projecting outwardly from a hydraulic cylinder 12, is coupled via a lug 28 with the sleeve 10 for axially displacing same. The hydraulic fluid is admitted into cylinder 12 from one side or the other, under the control of suitable valves not shown, for the purpose of either advancing the head 8 axially toward the workpiece (to the left in FIG. 3) or retracting it therefrom. A common source of fluid under pressure is represented in FIG. 1 by a pump 29 from which conduits 30 extend toward all the cylinders 12 whereby the paired heads 6 or 8 can be urged under equal hydraulic pressure toward each other and, thus, against the confronting sides of the intervening workpiece 1. This has been indicated diagrammatically by arrows 13, 14 in FIGS. 1, 4 and 6.

Figure 2:
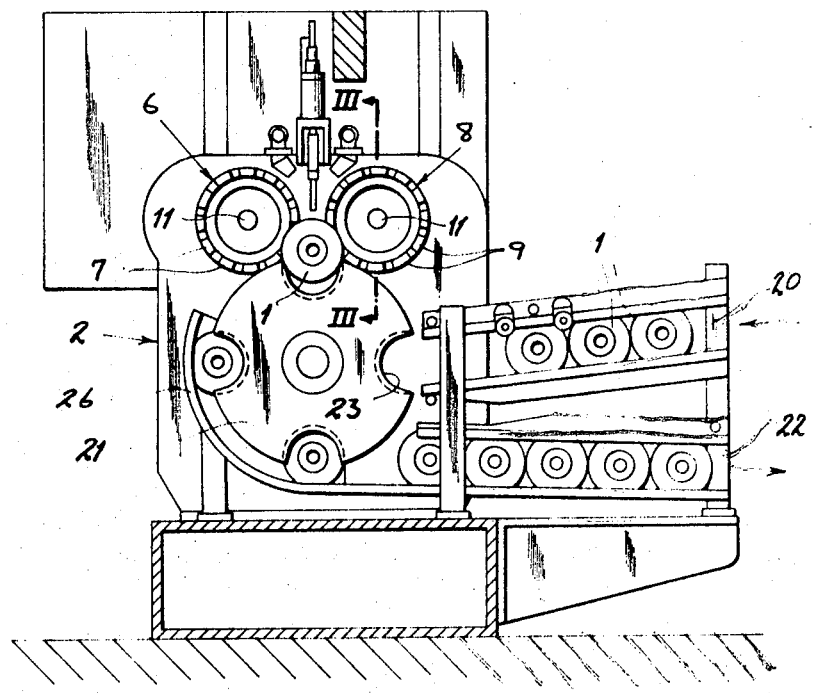
FIG. 2 is a cross-sectional view taken on the line over II—II of FIG. 1.
Figure 2:
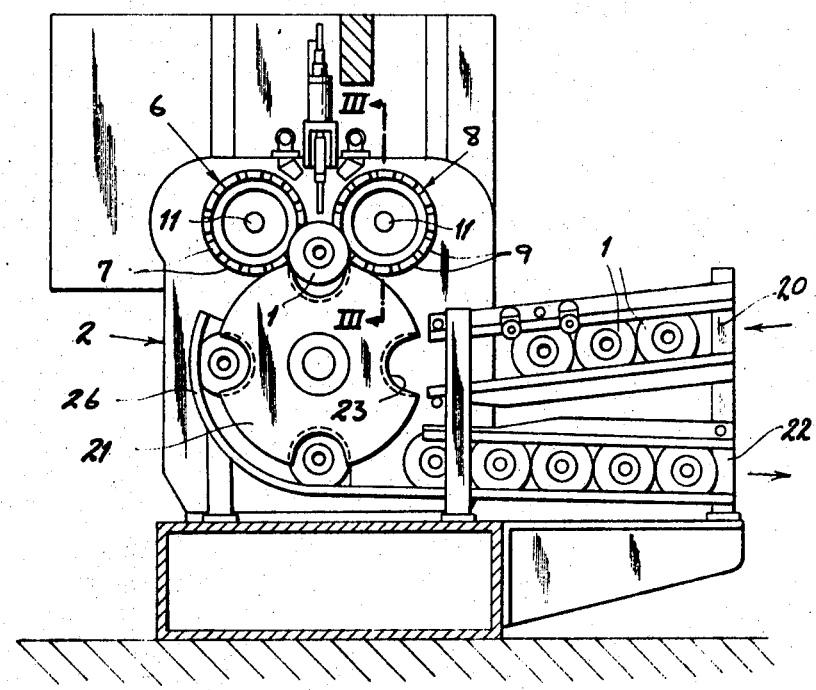

Rod 27 has an extension 15 which can be locked in a selected axial position by a clamping mechanism generally designated 16 in FIGS. 1 and 3. Specifically, this mechanism comprises a hydraulic brake with fluid-actuated clamping jaws 16a, 16b, (FIG. 3), normally held open by springs (not shown) or the like.

Shaft 11 is journaled in sleeve 10 through the intermediary of a rotatable tube 17 lodged in that sleeve. Two pulleys 18, 19 are independently rotatable to drive the tube 17 and the shaft 11, respectively, the somewhat slower rotation of tube 17 being superimposed upon that of shaft 11 to impart an oscillatory motion to the latter and to the head 8 carried thereon. Segments 9 are independently mounted with limited swivelability (for self-adjustment) on head 8, as are the segments 7 on head 6, each head of segments forming an annular array which sweeps a segmental zone of the associated disk surface.

The operation of the system so far described will now be explained with reference to FIGS. 4–7.

Figure 4:
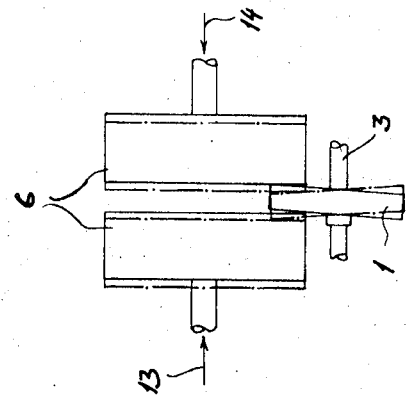

In FIG. 4 a disk 1 is shown slightly tilted on its spindle 3. Grinding heads 6 approach the workpiece 1 from opposite sides, oscillating under pressure between two axial positions (solid and dot-dash lines) after making contact with its confronting faces. Under the abrasive action of these grinders, the desk is slightly reduced in thickness but not materially altered in shape.

Figure 5:
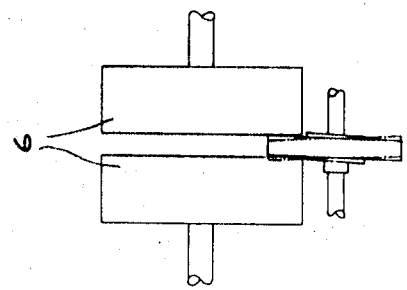

Next, as shown in FIG. 5, the heads 6 are axially locked in a position substantially midway between the two oscillatory positions illustrated in FIG. 4. With continued grinding, the overhanging peripheral portion of each disk surface is trimmed so that these surfaces become flattened and perpendicular to the axis over about half their circumferences.

Figure 6:
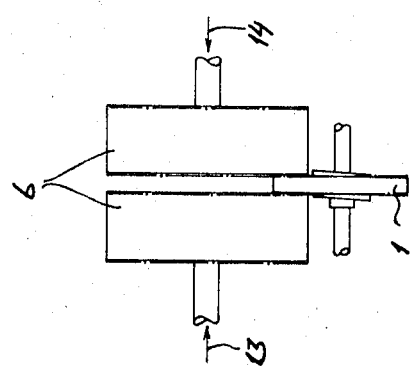

According to FIG. 6, the heads 6 can now again be unblocked so as to oscillate, with reduced axial sweep, in accordance with the modified disk surfaces. When each head reaches its most advanced position, it is again immobilized to produce the final disk shape illustrated in FIG. 7.

Figure 7:
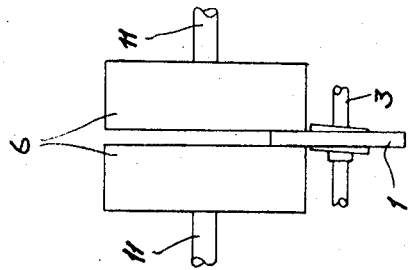
FIGS. 4, 5, 6 and 7 are diagrammatic representations of successive operating stages in the straightening of a warped workpiece by the method according to the invention.

The locking of the grinding heads is assumed to occur simultaneously in FIG. 5 and 180° out of phase in FIG. 7; if necessary, further stages of locking and unlocking could be inserted between, say, the operating phases shown in FIGS. 6 and 7. The relative thickness of disk 1 has been exaggerated in FIGS. 4–7 for clarity.

It will thus be seen that the method according to my invention, as particularly disclosed with reference to FIGS. 4–7, involves the truing of a slightly warped disk-shaped workpiece 1 by simultaneously advancing two rotating tools 6 from opposite sides into contact with the two faces of the rotating disk (FIG. 4), axially immobilizing these tools in positions separated by the thickness of the disk while the workpiece is in a first angular position (i.e. at right angles to the one shown in FIG. 5), releasing the tools 6 for further advance toward each other in contact with the as yet untrued portions of the respective disk faces (FIG. 6), and again axially immobilizing the previously released tools in mutually closer positions and in a second angular position of the workpiece (FIG. 7) to continue the operation. It will also be apparent that if the tools had been initially arrested in, say, the axial position shown in full lines in FIG. 4 in which the left-hand face of disk 1 would have been substantially fully trued by the corresponding tool (with virtually no correction of the warp of the right-hand face), it would have been necessary to release only the right-hand tool 6 for further axial advance toward its mate.

I claim:

1. An apparatus for the machining of disk-shaped workpieces, comprising:
    a holder engageable with a workpiece to be machined for rotating the latter about its axis;
    first and second shaft means movable toward each other parallel to said axis on opposite sides of said workpiece;
    drive means for concurrently rotating said first and second shaft means;
    first and second abrasive tool means respectively mounted on said first and second shaft means for contact with opposite sides of the workpiece;
    fluid-actuated means bearing axially upon said first and second shaft means for simultaneously advancing same under substantially equal pressure against said opposite sides of the workpiece during at least an initial phase of a machining operation, said holder comprising a retractable spindle; and
    intermittently operable feed means for aligning successive workpieces with said spindle for engagement thereby and for receiving the machined workpieces upon retraction of said spindle for delivery to a discharge point, said feed means comprising a reel having a center offset from said axis and rotatable about said center in a plane perpendicular to said axis, said reel being provided with peripheral recesses for receiving the workpieces, said axis being substantially horizontal, said reel being disposed below said axis and being provided with control means for alternately lifting and lowering said reel whereby a recess at the zenith thereof can be temporarily aligned with said spindle.

2. An apparatus as defined in claim 1, further comprising a pair of inversely sloping tracks terminating laterally of said reel for supplying fresh workpieces to said reel and subsequently removing same therefrom.

3. An apparatus as defined in claim 1 where said first and second tool means each comprises at least one grinding head and at least one finishing head, said first and second shaft means including a respective shaft for each of said heads.

4. An apparatus as defined in claim 3 wherein each of said heads comprises a ring of abrasive sectors confronting a corresponding ring on the opposite side of the workpiece.

5. An apparatus as defined in claim 3 wherein the shaft of each head is eccentrically mounted in a surrounding sleeve, said shaft and sleeve being rotatable at different rates by said drive means whereby said head executes an oscillatory motion superimposed upon its rotation.

6. An apparatus as defined in claim 1 wherein said fluid-actuated means is provided with blocking means selectively operable to halt the advance of said first and second shaft means toward each other at a later phase of said machining operation.

7. An apparatus as defined in claim 6 wherein said fluid-actuated means comprises a cylinder for each of said shaft means adapted to receive an operating fluid, and a piston in said cylinder having a rod coupled with the associated shaft means, said blocking means including a clamping mechanism engageable with said rod for immobilizing same with reference to said cylinder.

8. A method of truing a slightly warped disk-shaped workpiece with opposite faces nearly perpendicular to an axis, comprising the steps of:
  simultaneously advancing two abrasive rotatable tools from opposite sides into contact with said faces under substantially equal pressure while rotating said tools about a common axis offset from the workpiece axis and with concurrent rotation of the workpiece about its own axis;
  axially immobilizing said tools in positions separated by the thickness of the workpiece and in a first angular position of the workpiece while continuing the rotation of the tools and the workpiece about their respective axes whereby at least one of said faces is partially trued;
  releasing at least one of said tools for further advance toward the other tool in contact with a portion of a workpiece face not yet trued;
  again axially immobilizing the released tool in a position closer to the other tool and in a second angular position of the workpiece while continuing the rotation of the tools and the workpiece about their respective axes whereby at least the last-mentioned face is further trued;
  and proceeding in like manner until both faces are substantially fully trued.

9. A method as defined in claim 8 wherein said tools are allowed to oscillate axially between two limiting positions, to an extent determined by the warp of the workpiece periphery, while in contact with said faces and prior to the first immobilization thereof.

References Cited

UNITED STATES PATENTS

| | | | |
|---|---|---|---|
| 1,627,858 | 5/1927 | Morgal | 51—118 |
| 2,077,364 | 4/1937 | Indge et al. | 51—118 |
| 2,275,061 | 3/1942 | Indge | 51—120 X |
| 2,375,333 | 5/1945 | Troendly | 51—118 |
| 2,517,193 | 8/1950 | Fraser | 51—215 X |
| 3,001,337 | 9/1961 | Dunn | 51—111 |

FOREIGN PATENTS

| | | |
|---|---|---|
| 514,794 | 12/1930 | Germany. |
| 583,754 | 9/1933 | Germany. |

HAROLD D. WHITEHEAD, Primary Examiner

U.S. Cl. X.R.

51—132, 134, 215, 281